2,608,679

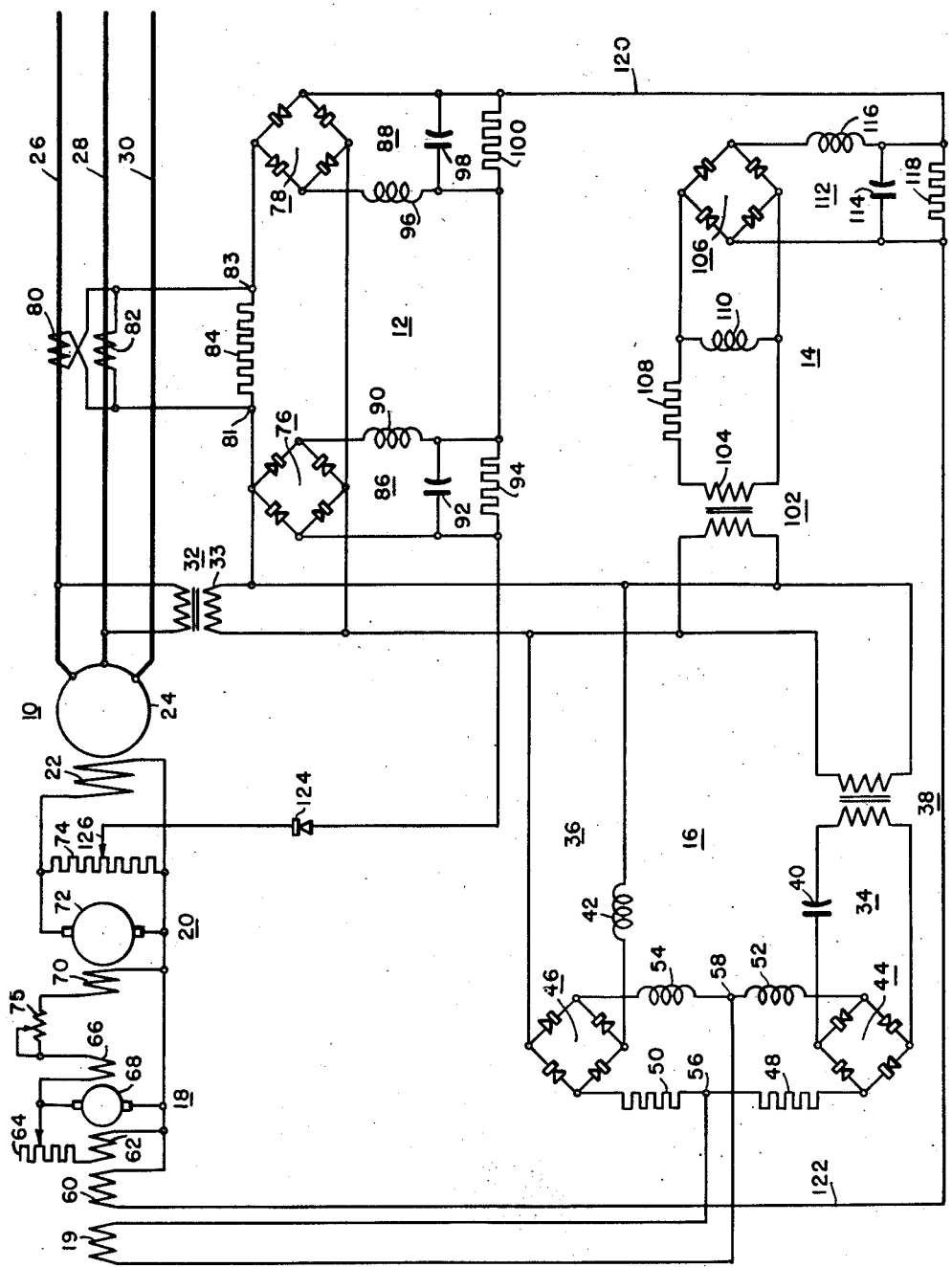
Aug. 26, 1952 — R. L. WITZKE — 2,608,679
STATIC NETWORK
Filed April 7, 1951
WITNESSES:
E. A. McCloskey
K. H. Thomas
INVENTOR
Raymond L. Witzke.
BY James N. Ely
ATTORNEY Patented Aug. 26, 1952

UNITED STATES PATENT OFFICE 2,608,679

STATIC NETWORK

Raymond L. Witzke, Pittsburgh, Pa., assignor to Westinghouse Electric Corporation, East Pittsburgh, Pa., a corporation of Pennsylvania Application April 7, 1951, Serial No. 219,884

6 Claims. (Cl. 322—24)

This invention relates to regulating systems and more particularly to regulating systems for maintaining the output voltage of a generator substantially constant.

Regulating systems have been utilized in which means are provided for preventing the field excitation of the generator from being reduced below a predetermined value so that the generator will not fall out of step. However, due to deficiencies in these prior art regulators the value at which the field excitation could not be further reduced varied depending upon other conditions in the regulating system. This variable value affected the kind of power factor that could be obtained for the generator since one must be able to reduce the generator field excitation to a low value in order to obtain a power factor that approaches unity or is leading and if the point at which the field excitation is limited is variable an allowance in the regulator settings must be made for this variation so that the generator can not possibly fall out of step and thus a limitation is placed on the type of power factor obtainable.

An object of this invention is the provision in a regulating system for maintaining the output voltage of a generator substantially constant of means to prevent a reduction of the generator field excitation below a predetermined value.

Another object of this invention is the provision of a regulator for use with a generator which will permit the power factor for the generator to be varied over wide limits while preventing the generator field excitation from being reduced below a fixed predetermined minimum value beyond which value the generator will fall out of step.

A still further object of this invention is the provision of regulating means for preventing the field excitation of a generator from being reduced below a predetermined minimum value with variations in generator terminal voltage.

Other objects of this invention will become apparent from the following description when taken in conjunction with the accompanying drawing, in which the single figure of the drawing is a diagrammatic representation of the regulating system embodying the apparatus and circuits of this invention. The regulating system illustrated in conjunction with a generator 10 comprises a watt network 12, a constant voltage network 14, a voltage reference network 16, a control exciter 18 having a control field winding 19, and a main exciter 20 for the generator 10. As in usual practice the generator 10 is disposed to supply line conductors 26, 28, and 30 and comprises a field winding 22 and an armature winding 24.

In order to obtain a signal that is indicative of whether the voltage output of the generator 10 is above or below its regulated value the voltage reference network 16 is provided. The input to the voltage reference network 16 is electrically connected to the line conductors 26 and 28 through a potential transformer 32 having a secondary winding 33 so as to be supplied in accordance with the voltage across these line conductors.

The voltage reference network 16 in the embodiment illustrated comprises a linear impedance circuit 34, and a non-linear impedance circuit 36 connected to be simultaneously energized in accordance with the voltage across the line conductors 26 and 28. As illustrated an insulating transformer 38 is connected in the input circuit of the linear impedance circuit 34. In this embodiment, the linear impedance element of the linear impedance circuit 34 comprises a capacitor 40 and the non-linear impedance element of the non-linear impedance circuit 36 comprises a saturating reactor 42.

The linear impedance circuit 34 and the non-linear impedance circuit 36 are electrically connected across the input terminals of dry-type rectifier units 44 and 46, respectively, the output terminals of the rectifier units being connected in series circuit relation with each other. In order to insure that the rectifier voltages remain positive for a predetermined change in the line voltage, a resistance member 48 is associated with the rectifier 44, and a resistance member 50 is associated with the rectifier 46, the resistance members 48 and 50 being connected in series circuit relation in the output circuits of the rectifiers. Smoothing reactances 52 and 54 are also connected in series circuit relation in the output circuits of the rectifiers 44 and 46.

In order to control the directional energization of the control field winding 19 of the control exciter 18, the winding 19 is electrically connected at points 56 and 58 to the direct-current series circuit that electrically connects together the output terminals of the rectifiers 44 and 46. When the output voltage of the generator 10 is at its regulated value the points 56 and 58 will be at zero potential and when there is an unbalance between the rectifiers 44 and 46 the field winding 19 is energized in one direction or the other to effect a change in the excitation of the control exciter 18.

The control exciter 18 is of the tuned type and comprises the control field winding 19, another control field winding 60, a shunt field winding 62 and adjustable resistance member 64 connected in series circuit relation with the shunt field winding 62, a self-energizing series field winding 66, and an armature winding 68 electrically connected across the series connected shunt field winding 62 and an adjustable resistance member 64. The self-excited series field winding 66 provides normal excitation for the control exciter 18 when the output voltage of the generator 10 is at its regulated value. The function of the control field winding 60 and the adjustable resistance member 64 will be hereinafter described.

The main exciter 20 is provided in order to vary the voltage across the generator field winding 22 and thus maintain the output voltage of the generator 10 substantially constant. The main exciter 20 comprises a field winding 70 and an armature winding 72 which is electrically connected across the generator field winding 22. A resistance member 74 is also electrically connected across the generator field winding 22, the purpose of which will be hereinafter described. In order that the main exciter 20 will function according to the output voltage of the control exciter 18, one end of the control winding 70 is electrically connected to both the armature winding 72 and the armature winding 68, the other end of the control field winding 70 being electrically connected through an adjustable resistance member 75 and the self-energizing field winding 66 to the armature winding 68 of the exciter 18. The adjustable resistor 75 cooperates with the adjustable resistor 64 to enable the tuning of the exciter 18.

The above-described voltage reference network 16, control exciter 18 and main exciter 20 serve to maintain the output voltage of the generator 10 at a substantially constant value. However, the field excitation of the generator 10 may be driven to such a minimum value due to system conditions that the generator 10 will fall out of step. In order to prevent the field excitation of the generator 10 from being driven down below the stable limit at which the generator would fall out of step, the control field winding 60 is provided for the exciter 18 and is so connected that the current flow through the control field winding 60 is dependent upon the voltage output from the watt network 12 and the voltage output from the constant voltage network 14.

In order to obtain a direct-current voltage that is a measure of the watt's output of the generator 10, the watt network 12 is provided. The watt network 12 comprises two dry-type rectifier units 76 and 78 and two current transformers 80 and 82 which are associated with the line conductors 26 and 28, respectively.

In order to obtain a voltage across the input to the rectifier 76 that is a measure of the output voltage of the generator 10, the input terminals of the rectifier 76 are electrically connected through the potential transformer 32 to the line conductors 26 and 28. The input terminals of the rectifier 78 are connected to be supplied from a circuit including the series connected secondary winding 33 of transformer 32 and a resistor 84 provided with terminals 81 and 83 whereby the voltage impressed across the rectifier 78 is a measure of the sum of the voltage and current outputs of the generator 10. The resistance member 84 is electrically connected across the parallel connected current transformers 80 and 82 to provide a voltage across the resistance member 84 that is a measure of the current output of the generator 10.

Filter circuits 86 and 88 are electrically connected to the output terminals of the rectifiers 76 and 78, respectively. As illustrated, the filter circuit 86 comprises a smoothing reactor 90 and a capacitor 92. The smoothing reactor 90 and the capacitor 92 are electrically connected in series circuit relation across the output terminals of the rectifier 76 and a load resistor 94 is electrically connected across the capacitor 92. As illustrated, the filter circuit 88 comprises a smoothing reactor 96 and a capacitor 98, the smoothing reactor 96 and the capacitor 98 being electrically connected in series circuit relation across the output terminals of the rectifier 78. A load resistor 100 is electrically connected across the capacitor 98. The load resistors 100 and 94 are connected in series circuit relation with the polarities of the voltages impressed thereacross opposed so that the sum of such voltages will be a measure of the difference between the voltage input to the rectifier 78 and the voltage input to the rectifier 76. This direct-current voltage that appears across the series connected load resistors 94 and 100 therefore constitutes a measure of the watt output of the generator 10.

The voltage that appears across the load resistors 94 and 100 combined varies between zero at zero watt output of the generator 10 to a predetermined maximum voltage at the maximum power output of the generator 10. Under many operating conditions it is necessary that the generator 10 have sufficient field current to permit sudden increases of watt output due to system disturbances. Therefore, it is necessary to add to that voltage that appears across the resistance members 94 and 100, a voltage that is of sufficient magnitude to obtain a minimum excitation on the generator 10 at zero power output. In this embodiment, the added voltage is obtained from the output of the constant voltage network 14. Such added voltage must be constant, otherwise the fluctuations in voltage will affect the current flow through the control of field winding 60, thus rendering a fluctuating cut-off point below which the field excitation of the generator 10 is prevented from further being reduced.

The constant voltage network 14 is electrically connected to the secondary winding 33 of the transformer 32 through a potential transformer 102 having a secondary winding 104. The constant voltage network 14 comprises a dry-type rectifier unit 106, a resistance member 108, a saturable reactor 110, and a filter circuit 112.

The saturable reactor 110 of the network 14 is electrically connected across the input terminals to the rectifier 106 in order that when the voltage across the secondary winding 104 of the transformer 102 increases the saturable reactor 110 will further saturate thus lessening its impedance and increasing the current flow therethrough. This increased current flow through the saturable reactor 110 increases the voltage drop across the resistance member 108 to thus decrease the voltage input to the rectifier 106 and maintain the voltage thereacross substantially constant.

The filter circuit 112 is electrically connected to the output terminals of the rectifier 106 and comprises a capacitor 114 and a smoothing reactor 116. As can be seen from the drawing, the smoothing reactor 116 and the capacitor 114 are electrically connected in series circuit relation across the output terminals of the rectifier 106 and a load resistor 118 is electrically connected across the capacitor 114.

In order that the current flow through the control field winding 60 of the control exciter 18 will be dependent on the voltage across the series connected load resistors 94 and 100 of the watt network 12 and upon the voltage across the load resistor 118 of the constant voltage network 14, the load resistors 94, 100 and 118 are connected in a circuit which extends from one end of the control field winding 60 of the control exciter 18 through conductor 122, the load resistor 118, the conductor 120, the load resistor 100, the load resistor 94, a oneway rectifier 124, a slidable contact member 126, and a portion of the resistance member 74 to the other end of the control field winding 60.

Referring to the drawing, in operation there is no flow of current through the control field winding 60 of the control exciter 18 unless the field excitation of the generator 10 is reduced below the hereinbefore mentioned stable limit. With no current flow through the control field winding 60, the voltage output of the control exciter 18 and thus the voltage across the generator field winding 22 is dependent upon the voltage across the control field winding 19 as well as the direction of flow of current therethrough. The direction of current flow through the control field winding 19 is dependent upon whether the output voltage of the generator 10 is above or below its regulated value.

Assuming that the output voltage, that is the voltage across the line conductors 26 and 28, is above the regulated value, there will be a greater current flow through the rectifier 46 than through the rectifier 44. This will effect a current flow through the control field winding 19 in a direction to produce a flux that opposes that flux produced by the field windings 62 and 66 to thus lower the output voltage of the control exciter 18. A decrease in the output voltage of the control exciter 18 decreases the voltage across the field winding 70 of the main exciter 20 thus decreasing its output voltage as well as the voltage across the field winding 22 to return the output voltage of generator 10 to its regulated value.

If, however, the voltage across the line conductors 26 and 28 is below the regulated value, there will be a greater current flow through the rectifier 44 than through the rectifier 46 thus effecting a current flow through the field winding 19 of the control exciter 18 in a direction to produce a flux that is additive to that flux produced by the field windings 62 and 66. The current flow through the control field winding 19 in this direction will increase the output of the control exciter 18 as well as the output voltage of the main exciter 20 and thus effect an increase in the voltage across the field winding 22 to return the output voltage of the generator 10 to its regulated value.

As long as the field excitation for the generator 10, that is the voltage across the generator field winding 22, does not fall below the stable limit, no current, as was hereinbefore mentioned, will flow through the control field winding 60 of the control exciter 18. However, assuming the filed excitation of the generator 10 tends to fall below the stable limit due to system conditions, the summation of the voltage across the load resistors 94 and 100 of the watt network 12 and the voltage across load resistor 118 of the constant voltage network 14 will be greater in magnitude than that voltage appearing across that portion of the resistance member 74 that is connected in series circuit relation with the slidable contact member 126 and the control field winding 60. When this condition exists, current will flow through the control field winding 60. However, it is to be noted that when the voltage across this same portion of the resistance member 74 is greater than the summation of the voltages across the load resistors 94, 100 and 118 no current will flow through the control field winding 60 since such a current flow is prevented by the oneway rectifier 124.

When current is flowing through the control field winding 60 of the control exciter 18 the flux produced by the control field winding 19 is opposing that flux produced by the field windings 60 and 62 and the flux produced by the control field winding 60 opposes that flux produced by the control field winding 19 to thus prevent the control field winding 19 from lowering the field excitation of the generator 10 below the stable limit. As the current flow through the control field winding 60 increases it finally reaches a magnitude equal in magnitude to that flux produced by the current flow through the control field winding 19. The slidable contact member 126 that makes electrical contact with the resistance member 74 can be so adjusted that current continues to flow through the control field winding 60 when the fluxes produced by the control field winding 60 and the control field winding 19 are equal in magnitude. Thus the current flow through the control field winding 60 continues to prevent the field excitation of the generator 10 from being reduced below the stable limit. As long as there is a tendency due to system conditions for the field excitation of the generator 10 to be reduced below its stable limit, the current flow through the control field winding 60 will prevent this field excitation from being reduced below such a limit.

It is to be understood that the regulating system embodying the teachings of this invention could be utilized on a single-phase system. When used on a single-phase system only one of the current transformers 80 or 82 would be needed and this transformer would be connected across the resistance member 84 as shown in the drawing and it would be associated with one of the conductors (not shown) of the single-phase system. Other than these changes the apparatus and circuits would be the same as that shown in the drawing.

Among the advantages of the regulating system embodying the teachings of this invention is the fact that a power factor more closely approaching unity or a leading power factor can be obtained and at the same time safety means are provided for preventing the field excitation of the generator 10 from being reduced below the stable limit so that the machine will not fall out of step.

I claim as my invention:

1. In a regulating system for preventing the field excitation of a generator from being reduced below the stable limit, the combination comprising, means for supplying the field excitation of the generator, a measuring network responsive to the output of the generator and disposed to produce a direct-current voltage that is a measure of the power output of the generator, a constant voltage source disposed to produce a substantially constant direct-current voltage, the measuring network and the constant voltage source being connected in circuit relation whereby the voltages therefrom are additive, and circuit means for applying the summation of said direct-current voltages to the field excitation supply means to control the operation thereof to prevent a reduction of the field excitation of the generator below a predetermined value whereby the excitation of the generator will not be reduced below the stable limit.

2. In a regulating system for preventing the field excitation of a generator from being reduced below the stable limit, the combination comprising, means for supplying the field excitation of the generator, a watt measuring network responsive to the output of the generator and disposed to produce a direct-current voltage that is a measure of the watt's output of the generator, a constant voltage source disposed to produce a substantially constant direct-current voltage, the watt measuring network and the constant voltage source being connected in circuit relation whereby the voltages therefrom are additive, and circuit means for applying the summation of said direct-current voltages to the field excitation supply means to control the operation thereof to prevent a reduction of the field excitation of the generator below a predetermined value whereby the excitation of the generator will not be reduced below the stable limit.

3. In a regulating system for preventing the field excitation of a generator from being reduced below the stable limit, the combination comprising, means for supplying the field excitation of the generator, a watt measuring network responsive to the power output of the generator and comprising two rectifier units, circuit means for applying a voltage to the input terminals of one of the rectifiers that is a measure of the output voltage of the generator and for applying a voltage to the input terminals of the other rectifier that is a measure of the summation of the output voltage and output current of the generator, a constant voltage source disposed to produce a substantially constant direct-current voltage, the watt measuring network and the constant voltage source being connected in circuit relation whereby the voltages therefrom are additive, and circuit means for applying the summation of said direct-current voltages to the field excitation supply means to control the operation thereof to prevent a reduction of the field excitation of the generator below a predetermined value whereby the excitation of the generator will not be reduced below the stable limit.

4. In a regulating system for preventing the field excitation of a generator that is disposed to supply three line conductors from being reduced below the stable limit, the combination comprising, means for supplying the field excitation of the generator, two current transformers associated with two of the line conductors, a potential transformer electrically connected across two of the line conductors and having a secondary winding, two rectifier units, a resistance member electrically connected across the two current transformers, circuit means for electrically connecting said secondary winding across the input terminals to one of the rectifier units and for electrically connecting said resistance member and said secondary winding in series circuit relation across the input terminals to the other rectifier unit so that said rectifier unit is responsive to a measure of the output voltage of the generator and said other rectifier unit is responsive to a measure of the summation of the output voltage and current of the generator, a constant voltage network disposed to produce a substantially constant direct-current voltage, the rectifier units and the constant voltage network being connected in circuit relation whereby the voltages from the rectifier units are subtractive and their combined voltage is additive to the voltage output of the constant voltage network, and other circuit means for applying the summation of said direct-current voltages to the field excitation supply means to control the operation thereof to prevent a reduction of the field excitation of the generator below a predetermined value whereby the excitation of the generator will not be reduced below the stable limit.

5. In a regulating system for preventing the field excitation of a generator that is disposed to supply three line conductors from being reduced below the stable limit, the combination comprising, means for supplying the field excitation of the generator, two current transformers associated with two of the line conductors, a potential transformer electrically connected across two of the line conductors and having a secondary winding, two rectifier units, a resistance member electrically connected across the two current transformers, circuit means for electrically connecting said secondary winding across the input terminals to one of the rectifier units and for connecting said resistance member and said secondary winding in series circuit relation across the input terminals to the other rectifier unit so that said rectifier unit is responsive to a measure of the output voltage of the generator and said other rectifier unit is responsive to a measure of the summation of the output voltage and current of the generator, filter means for filtering the output of said two rectifiers, a constant voltage network disposed to produce a substantially constant direct-current voltage, the rectifier units and the constant voltage network being connected in circuit relation whereby the filtered voltages from the rectifier units are subtractive and their combined voltage is additive to the voltage output of the constant voltage network, and other circuit means for applying the summation of said direct-current voltages to the field excitation supply means to control the operation thereof to prevent a reduction of the field excitation of the generator below a predetermined value whereby the excitation of the generator will not be reduced below the stable limit.

6. In a regulating system for a generator disposed to supply a load circuit, the combination comprising, an exciter for supplying the field excitation of the generator, a control field winding for the exciter disposed to be directionally energized, means responsive to a change in condition of the load circuit supplied by the generator disposed to control the directional energization of the control field winding, means for producing a first source of direct-current voltage which is a measure of the watt's output of the generator plus a substantially constant direct current voltage of predetermined magnitude, said last mentioned means comprising two rectifier units and means for applying a voltage to one of the rectifier units that is a measure of the voltage output of the generator and for applying to the other rectifier unit a voltage that is a measure of the sum of the generator output voltage and output current, means for producing a second source of direct-current voltage which is a measure of the voltage across the field winding of the generator, the direct-current voltages being of opposite sense, and a second control field winding for the exciter connected to said sources of direct-current voltage and disposed to be energized by the differential thereof only when the first direct-current voltage is in excess of said second direct-current voltage to provide excitation of the exciter to maintain the field excitation of the generator at not less than a predetermined minimum value.

RAYMOND L. WITZKE.

No references cited.